United States Patent [19]
Kabasawa

[11] Patent Number: 5,963,529
[45] Date of Patent: Oct. 5, 1999

[54] DISK APPARATUS HAVING A CARTRIDGE LIFTING MEMBER ACTUATED BY AN OPERATION MEMBER TO LIFT A DISK CARTRIDGE FROM A DISK TRAY

[75] Inventor: Hidetoshi Kabasawa, Ogawamachi, Japan

[73] Assignee: Teac Corporation, Tokyo, Japan

[21] Appl. No.: 08/988,892

[22] Filed: Dec. 11, 1997

[30] Foreign Application Priority Data

Dec. 25, 1996 [JP] Japan .................................... 8-346121

[51] Int. Cl.$^6$ .................................................. G11B 17/04
[52] U.S. Cl. ............................................................ 369/77.2
[58] Field of Search .............................. 369/75.1, 75.2, 369/77.1, 77.2; 360/96.5, 96.6, 99.02, 99.06

[56] References Cited

U.S. PATENT DOCUMENTS

| | | | |
|---|---|---|---|
| 4,641,297 | 2/1987 | Watanabe | 369/75.2 |
| 5,089,920 | 2/1992 | Bryer et al. | 360/92 |
| 5,243,478 | 9/1993 | Kawakami et al. | 360/96.5 |
| 5,295,025 | 3/1994 | Eguchi et al. | 360/92 |
| 5,432,654 | 7/1995 | Ooka | 360/96.6 |
| 5,757,577 | 5/1998 | Yamanaka et al. | 360/94 |

FOREIGN PATENT DOCUMENTS

| | | |
|---|---|---|
| 7161112 | 6/1995 | Japan . |
| 7-240054 | 9/1995 | Japan . |

*Primary Examiner*—David L. Ometz
*Attorney, Agent, or Firm*—Ladas & Parry

[57] ABSTRACT

A disk apparatus includes a disk tray having a cartridge holding surface which holds a disk cartridge thereon, the disk cartridge containing an optical disk therein, the tray being movable between a disk-change position and a disk-loaded position. A cartridge lifting member is provided on the tray and lifts the cartridge to a position higher than the cartridge holding surface in the tray, the cartridge lifting member having a contact arm brought into contact with a bottom of the cartridge held on the cartridge holding surface of the tray. An operation member actuates the cartridge lifting member when the tray is set at the disk-change position and the operation member is manipulated by an operator, so that the bottom of the cartridge is lifted to the position higher than the cartridge holding surface by the contact arm in response to a movement of the cartridge lifting member.

9 Claims, 15 Drawing Sheets

DISK APPARATUS HAVING A CARTRIDGE LIFTING MEMBER ACTUATED BY AN OPERATION MEMBER TO LIFT A DISK CARTRIDGE FROM A DISK TRAY

BACKGROUND OF THE INVENTION

(1). Field of the Invention

The present invention relates to a disk apparatus wherein one of a CD-ROM and a disk cartridge is held on a disk tray at a loaded position and reproduction or recording for a related disk is carried out by using a pickup unit.

(2). Description of the Related Art

An optical disk is inserted into an optical disk drive, and the optical disk drive reads information from or writes information to the optical disk by using an optical pickup unit. The optical pickup unit emits a light beam to the disk and receives reflection beams from the disk to which the emission beam is applied. When the optical disk drive is operating in a reading mode, the optical pickup unit detects pits in a track of the disk from the reflection beams in order to read data from the disk.

Currently, there are two major types of optical disk drives: a read-only type and a rewritable type. The read-only optical disk drives read information from an optical disk, such as a CD (compact disk) or a CD-ROM (compact disk read-only memory). The rewritable optical disk drives can read information from and write information to an optical disk. Among the rewritable optical disk drives are a write-once disk system and an erasable disk system. The write-once disk system accesses an optical disk such as a CD-R (compact disk-recordable), and can write data to the disk once only. The erasable disk system accesses an optical disk, such as a PD (phase-change material disk) or a CD-RW (compact disk-rewritable), and can write data to the disk many times.

Existing optical disk drives are provided for accessing only one of the above-mentioned optical disk types. In order to allow both the read-only disk (CD, CD-ROM) and the rewritable disk (CD-R, PD, CD-RW) to be accessed, it has been necessary to use two or more of the existing optical disk drives in combination. Recently, in order to eliminate such inconvenience, development has started on an optical disk apparatus in which either one of the read-only disk and the rewritable disk can be held on a disk tray at a loaded position and reproduction or recording with respect to a related disk can be carried out. A conventional disk apparatus of this type is known. In the conventional disk apparatus, one of a CD-ROM and a PD disk cartridge can be held on a disk tray at a loaded position and reproduction or recording with respect to a related disk can be carried out.

FIG. 19 shows the conventional disk apparatus of the above-mentioned type, wherein one of the CD-ROM and the disk cartridge is capable of being held on a disk tray at a loaded position.

As shown in FIG. 19, in the conventional disk apparatus, a turntable 2 and an optical pickup unit 3 are provided on a chassis 1. An optical disk (not shown) is clamped with and rotated by the turntable 2. A disk tray 4 is movably supported on the chassis 1, and one of the CD-ROM (not shown) and the disk cartridge (not shown) is inserted in the disk tray 4. The disk tray 4 is arranged such that the tray 4 is movable relative to the chassis 1 between a disk-loaded position and a disk-change position.

The disk tray 4 has a double-tray structure including an inner tray 4a on which the CD-ROM is placed and an outer tray 4b on which the disk cartridge is placed. The inner tray 4a is provided within the outer tray 4b such that the inner tray 4a is vertically movable between a lowered position and a raised position.

In the conventional disk apparatus, when the disk cartridge is inserted in the tray 4, the disk cartridge is placed on the inner tray 4a. The inner tray 4a serves as a holding surface on which the disk cartridge is held. Since the cartridge is snugly fitted in the outer tray 4b, the inner tray 4a has a cut-out portion 4c provided at a front end portion of the inner tray 4a, in order to allow an operator to easily take the cartridge out of the tray 4.

When taking the cartridge out of the tray 4 at the disk-change position, the operator has to manually raise a front edge of the cartridge from the outer tray 4b by pushing upward the front edge of the cartridge from the cut-out portion 4c of the inner tray 4a. For the conventional disk apparatus, the operator takes the cartridge out of the tray 4 in this manner.

In the conventional disk apparatus, the inner tray 4a includes a first circular recess 4a1 in which an optical disk having an 8-cm diameter is fitted, and a second circular recess 4a2 in which another optical disk having a 12-cm diameter is fitted.

In the disk tray 4 of the conventional disk apparatus, the inner tray 4a is set at the raised position within the outer tray 4b due to a actuating force of a spring (not shown). When the CD-ROM is inserted in the tray 4, the CD-ROM is supported on the inner tray 4a at the raised position. On the other hand, when the disk cartridge is inserted in the tray 4, the inner tray 4a is vertically moved to the lowered position by the cartridge. The disk cartridge is supported on the outer tray 4b, and the inner tray 4a at the lowered position is placed beneath the bottom of the cartridge within the outer tray 4b.

In the conventional disk apparatus, a support plate 5 is provided on the disk tray 4, and an upper area located above the chassis 1 is enclosed by the support plate 5. A shutter lever 6 is provided on a bottom surface of the support plate 5. The shutter lever 6 serves to open a shutter in the disk cartridge when the cartridge is inserted in the tray 4 and the tray 4 is moved from the disk-change position to the disk-loaded position.

As described above, in the conventional disk apparatus, when taking the cartridge out of the tray 4, the operator has to manually raise the front edge of the cartridge from the outer tray 4b by pushing upward the front edge of the cartridge from the cut-out portion 4c of the inner tray 4a. This operation has been inconvenient for the operator. It is desired to provide increased convenience to the operator with respect to the disk apparatus of the above type so that the operator can more easily take the disk cartridge out of the disk tray.

Further, in order to form the cut-out portion 4c in the inner tray 4a, it is necessary to make a thickness of the inner tray 4a large enough to ensure a sufficient strength of the inner tray 4a. For this reason, it is difficult that an entire thickness of the tray 4 be reduced while a sufficient strength of the tray 4 is ensured. This makes it difficult to provide a small-thickness structure for an optical disk drive installed in a personal computer. Recently, notebook-size personal computers having a built-in optical disk drive as standard equipment have been widespread, and there is a demand for reducing an entire thickness of the built-in optical disk drive for use in the notebook-size personal computers.

SUMMARY OF THE INVENTION

An object of the present invention is to provide an improved disk apparatus in which the above-described problems are eliminated.

Another object of the present invention is to provide a disk apparatus which provides a small-thickness structure for an optical disk drive installed in a notebook-size computer while a disk tray is capable of holding one of a disk, such as a CD-ROM, and a disk cartridge, such as a PD disk cartridge, at a disk-loaded position.

Still another object of the present invention is to provide a disk apparatus which provides increased convenience to an operator when taking a disk cartridge, such as a PD disk cartridge, out of a disk tray while the disk tray is capable of capable of holding one of a disk, such as a CD-ROM, and the disk cartridge at a disk-loaded position.

The above-mentioned objects of the present invention are achieved by a disk apparatus which comprises: a disk tray having a cartridge holding surface which holds a disk cartridge thereon, the disk cartridge containing an optical disk therein, the tray being movable between a disk-change position and a disk-loaded position; a cartridge lifting member, provided on the tray, which lifts the cartridge to a position higher than the cartridge holding surface in the tray, the cartridge lifting member having a contact arm brought into contact with a bottom of the cartridge held on the cartridge holding surface of the tray; and an operation member which actuates the cartridge lifting member when the tray is set at the disk-change position and the operation member is manipulated by an operator, so that the bottom of the cartridge is lifted to the position higher than the cartridge holding surface by the contact arm in response to a movement of the cartridge lifting member.

In the disk apparatus of the present invention, when the disk tray is set at the disk-change position and the operator pulls the front bezel (or the operation member) open when taking the disk cartridge out of the disk tray, the contact arm of the cartridge lifting member lifts the bottom of the cartridge to the higher position from the cartridge holding surface of the tray in response to the movement of the front bezel. Therefore, the disk apparatus of the present invention is effective in providing increased convenience to the operator, and the operator can more easily take the disk cartridge out of the disk tray than in the conventional disk apparatus.

Further, in the disk apparatus of the present invention, it is only required that an entire thickness of the disk tray be greater than a sum of a thickness of the disk cartridge and a thickness of a disk supporting member. The thickness of the inner tray as in the conventional disk tray is significantly greater than the thickness of the disk supporting member in the disk apparatus of the present invention. The entire thickness of the disk tray of the present invention can be reduced to a thickness significantly smaller than the entire thickness of the conventional disk tray. Therefore, the disk apparatus of the present invention is effective in providing a small-thickness structure for an optical disk drive installed in a notebook-size computer while the disk tray is capable of holding one of the CD-ROM and the disk cartridge at the disk-loaded position.

BRIEF DESCRIPTION OF THE DRAWINGS

The above and other objects, features and advantages of the present invention will be more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 1:
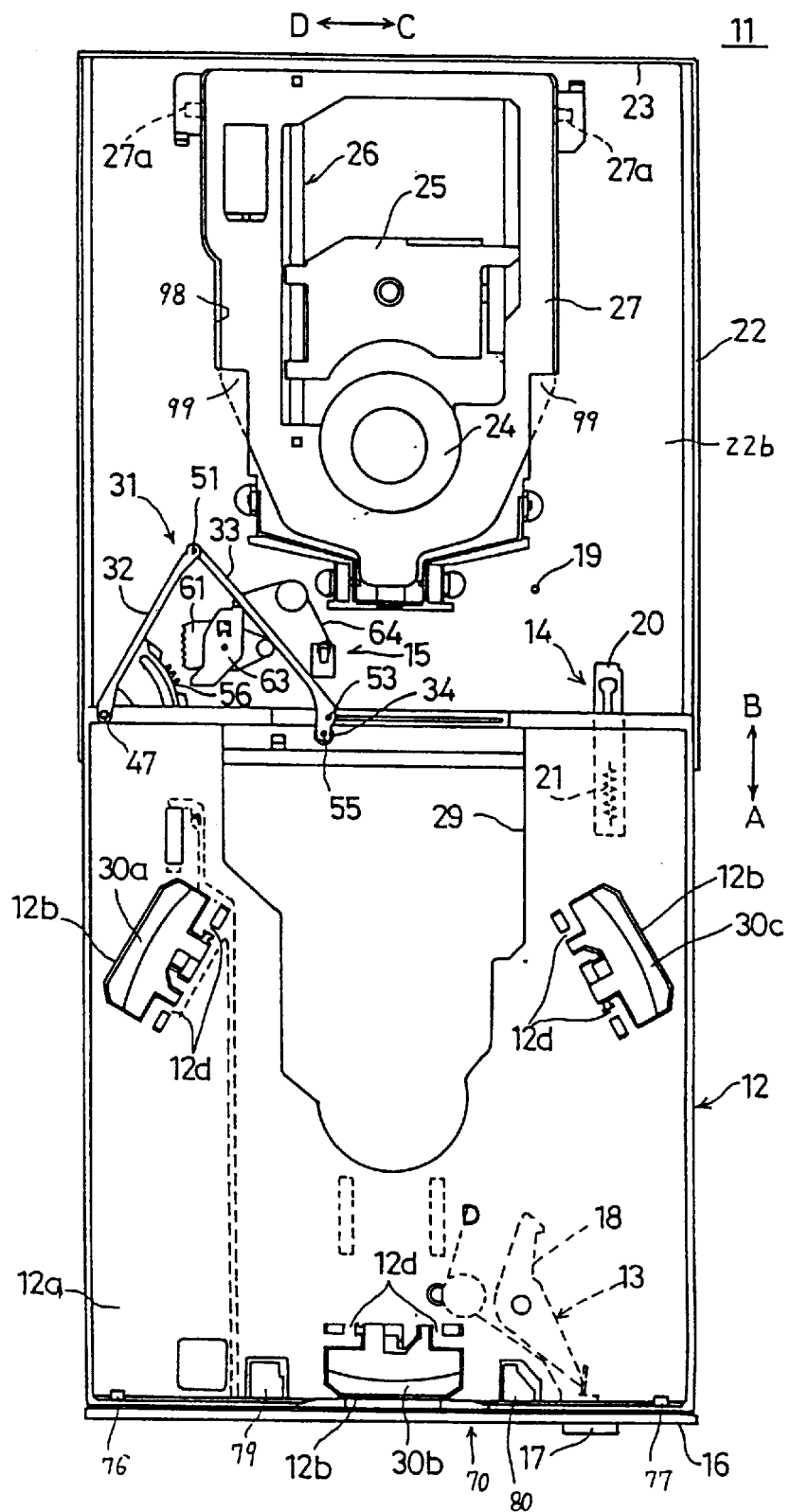
FIG. 1 is a top view of an embodiment of a disk apparatus of the present invention in which a disk tray is pulled open.
Figure 2:
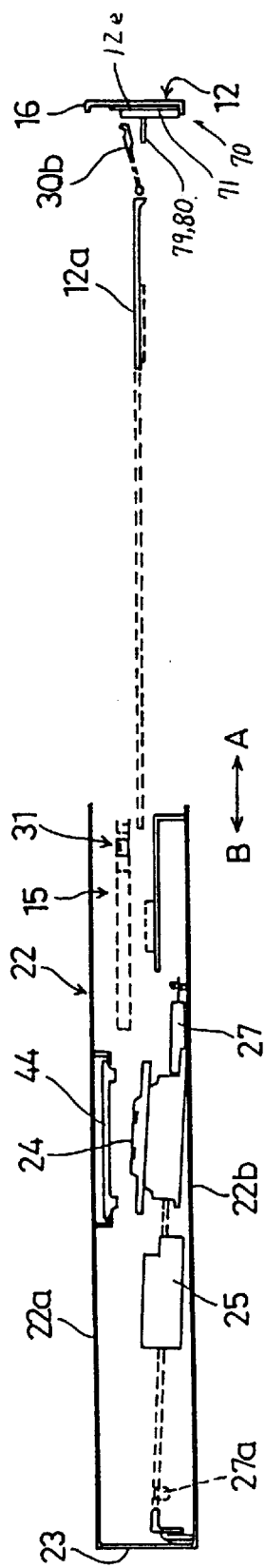
FIG. 2 is a cross-sectional view of the disk apparatus of FIG. 1.
Figure 3:
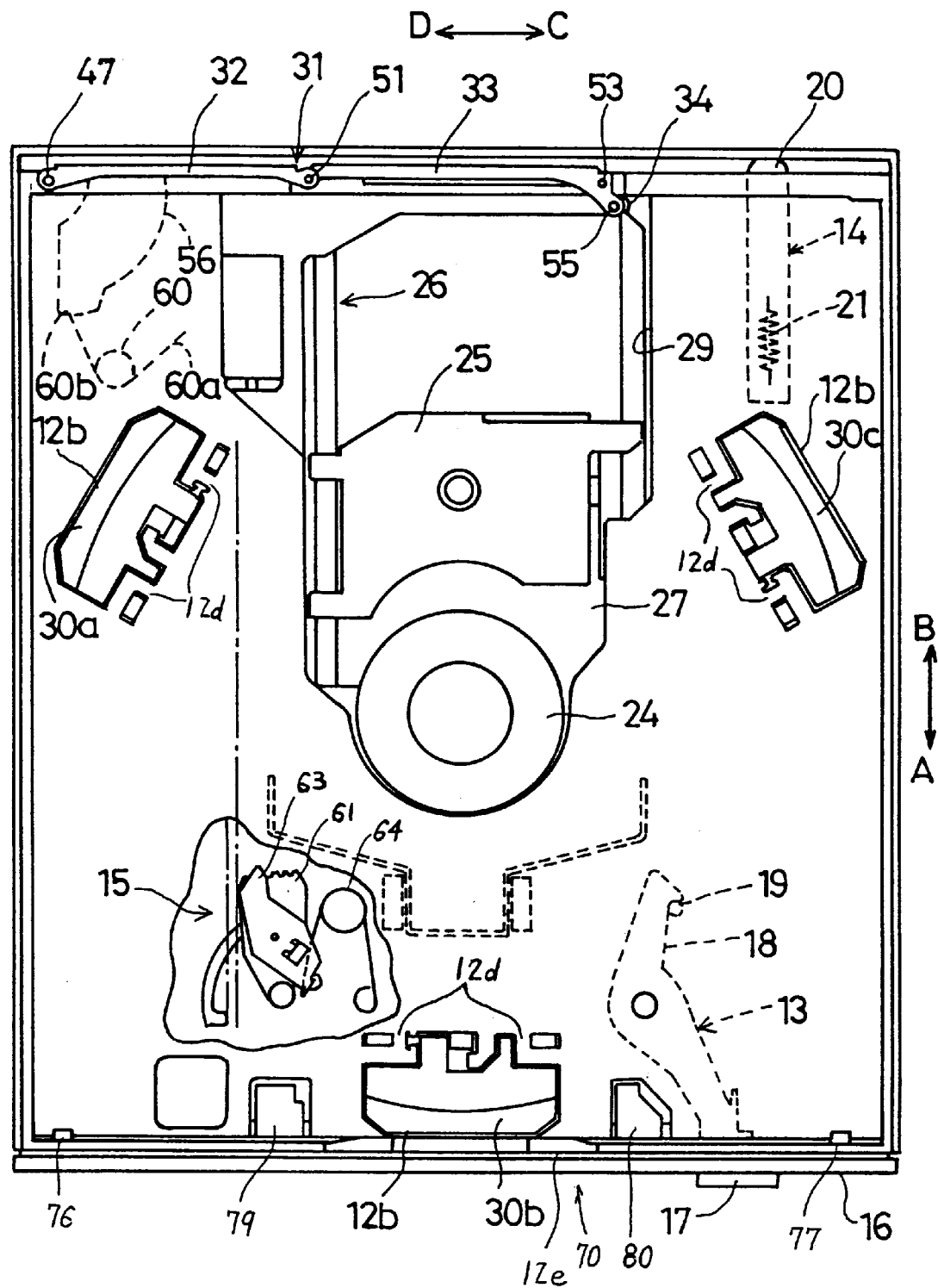
FIG. 3 is a top view of the disk apparatus of FIG. 1 in which the disk tray is moved to a disk-loaded position.
Figure 4:
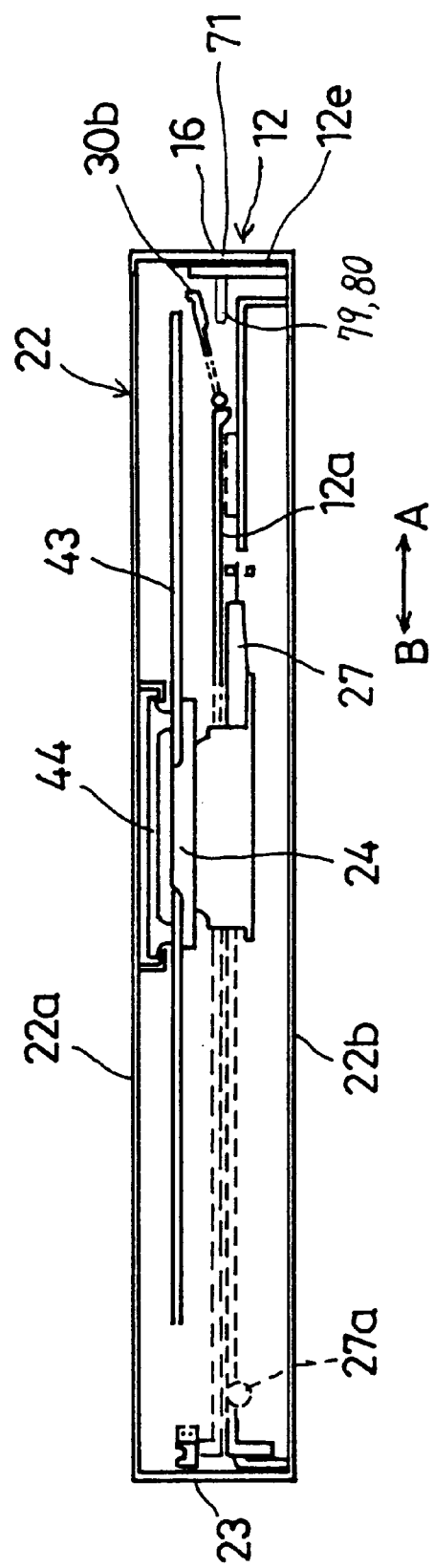
FIG. 4 is a cross-sectional view of the disk apparatus of FIG. 3.

FIG. 1 shows an embodiment of a disk apparatus 11 of the present invention in which a disk tray is pulled open. FIG. 2 is a cross-sectional view of the disk apparatus 11. FIG. 3 shows the disk apparatus 11 in which the disk tray is set at a loaded position. FIG. 4 is a cross-sectional view of the disk apparatus of FIG. 3.

The disk apparatus 11 is used as an external disk drive installed in a personal computer (not shown).

The disk apparatus 11 comprises a disk tray 12 on which one of a CD-ROM and a PD disk cartridge 45 is held. The disk tray 12 is arranged such that the tray 12 is movable between a disk-loaded position and a disk-change position in one of an ejecting direction, indicated by the arrow "A" in FIGS. 1–4, and an inserting direction, indicated by the arrow "B" in FIGS. 1–4.

The CD-ROM is a type of optical disk and the CD-ROM is designated by reference numeral 43. The disk cartridge 45 contains an optical disk (such as a PD) therein and the optical disk in the disk cartridge 45 is also designated by reference numeral 43.

The disk apparatus 11 comprises a tray locking unit 13 which locks the disk tray 12 at the disk-loaded position, a tray pressing unit 14 which presses the disk tray 12 in the ejecting direction A, and a shutter open/close unit 15 which opens or closes a shutter in the disk cartridge 45.

When the disk tray 12 is set at the disk-loaded position and placed within a chassis 22, as shown in FIG. 3, a lock lever 18 provided on a back side of the disk tray 12 is connected to a connecting pin 19 on the chassis 22. Thus, the tray locking unit 13 locks the disk tray 12 at the disk-loaded position.

The tray locking unit 13 unlocks the disk tray 12 when an eject button 17 on a front bezel 16 is pressed by an operator. When the eject button 17 is pressed, the lock lever 18 on the back side of the disk tray 12 is disconnected from the connecting pin 19 on the chassis 22, so that the tray locking unit 13 unlocks the disk tray 12.

The tray pressing unit 14 includes a pressing lever 20 and a helical spring 21. When the tray locking unit 13 unlocks the disk tray 12, the pressing lever 20 pushes a rear end wall 23 of the chassis 22 due to an actuating force of the spring 21 so that the disk tray 12 is moved relative to the chassis 22 in the ejecting direction A by the pressing lever 20. This makes it possible that the operator easily pulls the disk tray 12 out of the chassis 22 and moves the disk tray 12 to the disk-change position, as shown in FIG. 1.

In the disk apparatus 11 of the present embodiment, a cartridge ejection unit 70 is provided between a front surface of the tray 12 and an inside surface of the front bezel 16. The cartridge ejection unit 70, which will be described later, lifts a front portion of the cartridge 45 to a higher position on the tray 12 when the tray 12 is set at the disk-change position and the operator pulls the front bezel 16 open in order to take the cartridge 45 out of the tray 12. The front bezel 16 serves as an operation member which is manipulated by the operator when taking the cartridge 45 out of the tray 12.

The front bezel 16 is rotatably supported by supporting members on the front surface of the disk tray 12 such that the front bezel 16 is vertically rotatable around the supporting members. When taking the cartridge 45 out of the tray 12, the operator pulls the front bezel 16 open so as to rotate downward the front bezel 16 around the supporting members. The cartridge ejection unit 70 lifts the front portion of the cartridge 45 from the cartridge holding surface 12a of the tray 12 in response to the movement of the front bezel 16. The operator can easily take the cartridge 45 out of the tray 12.

In the disk apparatus 11 of the present embodiment, it is possible to provide increased convenience to the operator when taking the cartridge 45 out of the tray 12, by providing the cartridge ejection unit 70. It is not necessary to make the entire thickness of the tray large enough to ensure a sufficient strength of the tray as in the conventional disk apparatus of FIG. 19. The entire thickness of the tray 12 of the present embodiment can be reduced to a thickness significantly smaller than the entire thickness of the conventional disk tray.

As shown in FIG. 1, on the bottom surface of the chassis 22, a traverse unit 27 is provided such that the traverse unit 27 is vertically rotatable around a shaft 27a at a rear end of the traverse unit 27. The traverse unit 27 includes a turntable 24, an optical pickup unit 25 and a pickup drive 26 which are provided on the traverse unit 27. The turntable 24 is rotated by a motor (not shown) so as to rotate an optical disk on the turntable 24 around a center of the turntable 24. The pickup unit 25 is used to read data from or write data onto a recording layer of the optical disk. The pickup drive 26 controls operation of the pickup unit 25.

The shaft 27a of the traverse unit 27 is provided at a rear end portion of the chassis 22, and the traverse unit 27 is provided such that a front end of the traverse unit 27 is vertically moved up and down within the internal space of the chassis 22 in response to the rearward and forward movements of the disk tray 12. Specifically, the front end of the traverse unit 27 is moved down as shown in FIG. 2 in response to the forward movement of the disk tray 12 when the disk tray 12 is moved forward to the disk-change position. The front end of the traverse unit 27 is moved up as shown in FIG. 4 in response to the rearward movement of the disk tray 12 when the disk tray 12 is moved rearward to the disk-loaded position.

A base 22b of the chassis 22 includes an opening 98 having a configuration in conformity with the turntable 24, the pickup unit 25 and the pickup drive 26. The opening 98 has a pair of contact portions 99 provided at right and left side edges of the opening 98. The contact portions 99 inwardly extend from the side edges of the opening 98. When the front end of the traverse unit 27 is moved up, the traverse unit 27 is brought into contact with the contact portions 99 so that the disk 43 on the turntable 24 in the traverse unit 27 is positioned at a read/write position.

As shown in FIG. 4, the disk tray 12 is set at the disk-loaded position, the traverse unit 27 is moved up, and the turntable 24 in the traverse unit 27 brings the disk 43 (one of the CD-ROM and the disk cartridge 45) on the disk tray 12 into contact with a clamper 44. The clamper 44 is provided on a top plate 22a of the chassis 22, and the disk 43 at this time is clamped between the turntable 24 and the clamper 44. The pickup unit 25 is used to read data from or write data onto a recording layer of the disk 43 being clamped.

The disk tray 12 has a cartridge holding surface 12a on which the disk cartridge 45 is placed. The cartridge holding surface 12a includes an opening 29 having a configuration in conformity with the turntable 24, the pickup unit 25 and the pickup drive 26.

As shown in FIG. 1 and FIG. 3, in the disk apparatus 11 of the present embodiment, a plurality of disk supporting members 30 are provided on the disk tray 12 around the periphery of the opening 29. In the present embodiment, the plurality of disk supporting members 30 are three disk supporting members 30a–30c which are arranged on the tray 12 in a radial formation (or at 120-degree intervals) around the center of the disk 43 or the disk cartridge 45 held on the tray 12.

The disk tray 12 includes a plurality of openings 12b in the cartridge holding surface 12a which are arranged in a radial formation in conformity with the disk supporting members 30. In the present embodiment, the plurality of openings 12b are three openings arranged in a radial formation (or at 120-degree intervals) around the center of the disk 43 or the disk cartridge 45. As shown in FIG. 1 and FIG. 3, the disk supporting members 30a–30c are provided in the openings 12b.

The disk tray 12 includes a plurality of bearing portions 12d in the cartridge holding surface 12a which are respectively provided adjacent to the openings 12b. The disk supporting members 30a–30c have the same configuration, and they are rotatably supported on the cartridge holding surface 12a of the tray 12 by the bearing portions 12d. Each of the disk supporting members 30 has a helical torsion spring (not shown in FIGS. 1–4), and the helical torsion spring exerts an actuating force on a respective one of the disk supporting members 30 such that the disk supporting members 30 are actuated to disk-support positions by the springs. When the disk supporting members 30 are set at the disk-support positions, the disk supporting members 30 extend upward from the openings 12b of the tray 12.

In the disk apparatus 11 of the present embodiment, when the disk cartridge 45 is inserted in the disk tray 12, the disk supporting members 30 are rotated downward to horizontal positions by a weight of the cartridge 45 against the actuating force of the springs. When the disk supporting members 30 are set at the horizontal positions, the disk supporting members 30 are included in the openings 12b of the tray 12.

Each of the disk supporting members 30 in the present embodiment is vertically rotatable around a rotating axis of a rotatable shaft between the disk-support position and the horizontal position.

Further, in the disk apparatus 11 of the present embodiment, when the tray 12 on which the cartridge 45 is held is set at the disk-loaded position, retaining portions (which will be described later) in the cartridge ejection unit 70 are fitted into recesses 45e of the cartridge 45. The cartridge 45 is held at a given position in the tray 12 by connection of the retaining portions and the recesses 45e of the cartridge 45 due to an actuating force of a helical torsion spring (which will be described later) in the cartridge ejection unit 70. The disk supporting members 30 are rotated downward to the horizontal positions by the weight of the cartridge 45. When the disk supporting members 30 are set at the horizontal positions, the disk supporting members 30 are included in the openings 12b of the tray 12 and located below the top of the cartridge holding surface 12a in the tray 12.

Figure 5A:
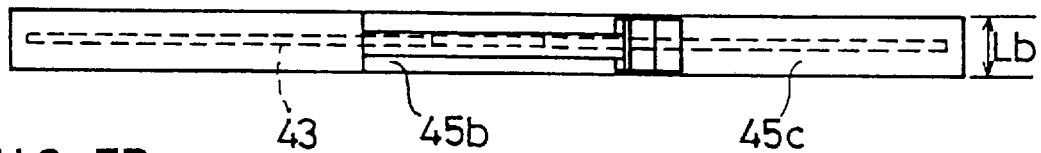
FIG. 5A and FIG. 5B are enlarged top and front views of a disk cartridge.
Figure 5B:
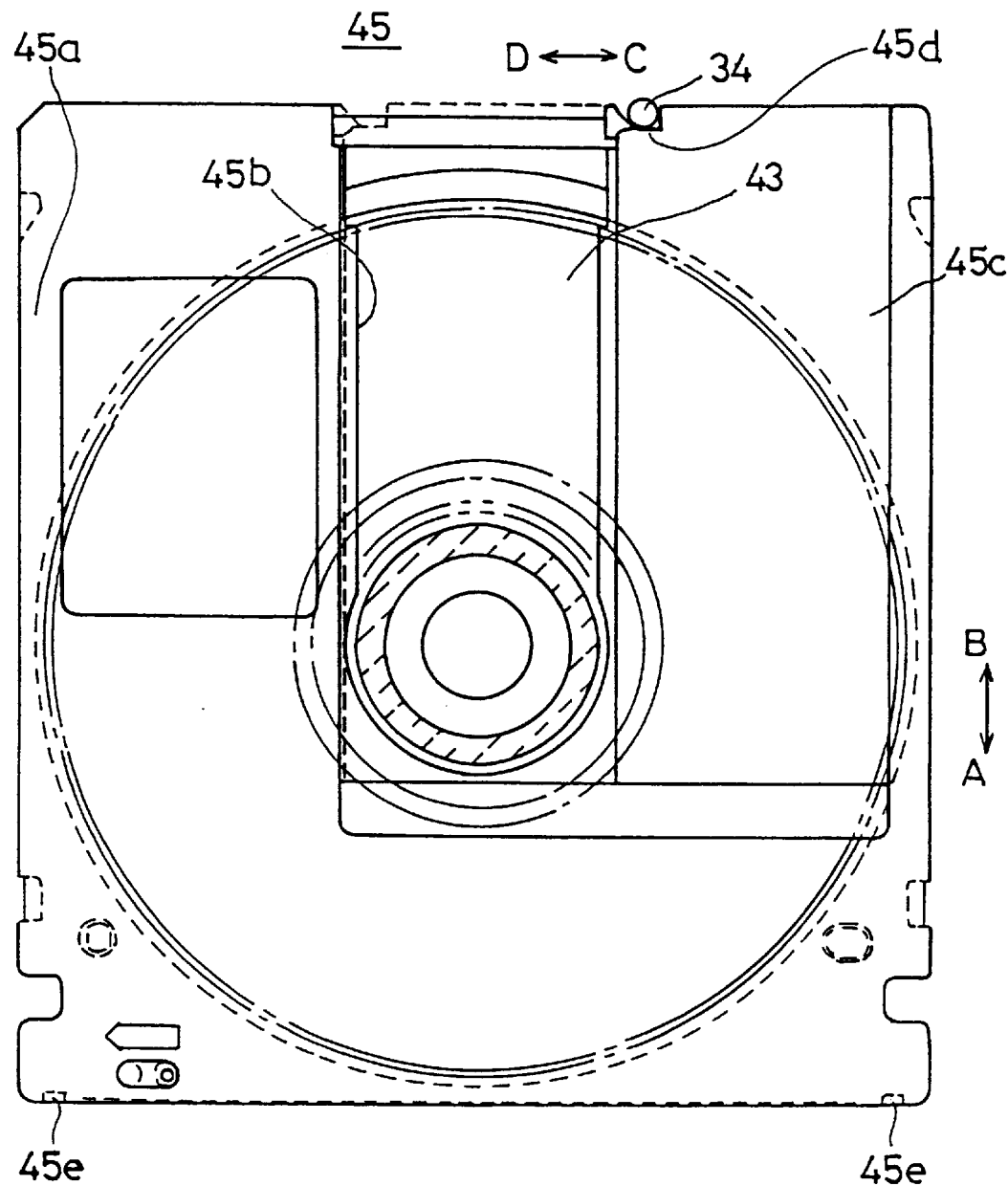

FIG. 5A and FIG. 5B show a configuration of the disk cartridge 45.

As shown in FIG. 5A and FIG. 5B, the disk cartridge 45 comprises a case 45a which encloses the optical disk 43 therein. The case 45a has a front surface and a rear surface each of which includes a rectangular opening 45b. The openings 45b on the front and rear surfaces of the case 45a extend in a radial direction of the disk 43. The openings 45b in the case 45a allow the optical pickup unit 25 to access the disk 43 for recording or reproduction.

The disk cartridge 45 comprises a shutter 45c provided to open or close the openings 45b in the case 45a. The shutter 45c is attached to the case 45a, and the shutter 45c is movable relative to the case 45a in one of an opening direction, indicated by the arrow "C" in FIG. 5B, and a closing direction, indicated by the arrow "D" in FIG. 5B. When the cartridge 45 is not held on the disk tray 12, the shutter 45c is set at a closed position due to an actuating force of a spring (not shown) so that the openings 45b in the case 45a are closed by the shutter 45c. When the cartridge 45 is held on the disk tray 12 at the disk-loaded position, the shutter 45c is moved in the direction C and set at an open position by the shutter open/close unit 15 so that the openings 45b in the case 45a are open.

As shown in FIG. 1 and FIG. 3, a shutter arm 31 is provided at a rear end portion of the disk tray 12, and the shutter arm 31 is rotatably supported on the disk tray 12. When the cartridge 45 is held on the disk tray 12 at the disk-loaded position, the shutter arm 31 is actuated by the shutter open/close unit 15 so as to move the shutter 45c of the cartridge 45 to the open position.

The shutter arm 31 comprises a first arm 32, a second arm 33 and a connecting roller 34. The first arm 32 is rotatably supported at the rear end corner of the disk tray 12, and the first arm 32 is rotated clockwise in response to the rearward movement of the tray 12. The second arm 33 is rotatably linked to an end of the first arm 32, and the second arm 33 is rotated in accordance with the rotation of the first arm 32. The connecting roller 34 is provided at an end of the second arm 33, and the connecting roller 34 is connected to the shutter 45c of the disk cartridge 45. The connecting roller 34 is movable along a rear end wall of the disk tray 12 in one of the direction C and the direction D by the rotation of the shutter arm 31 in response to the forward and rearward movements of the tray 12.

Figure 6:
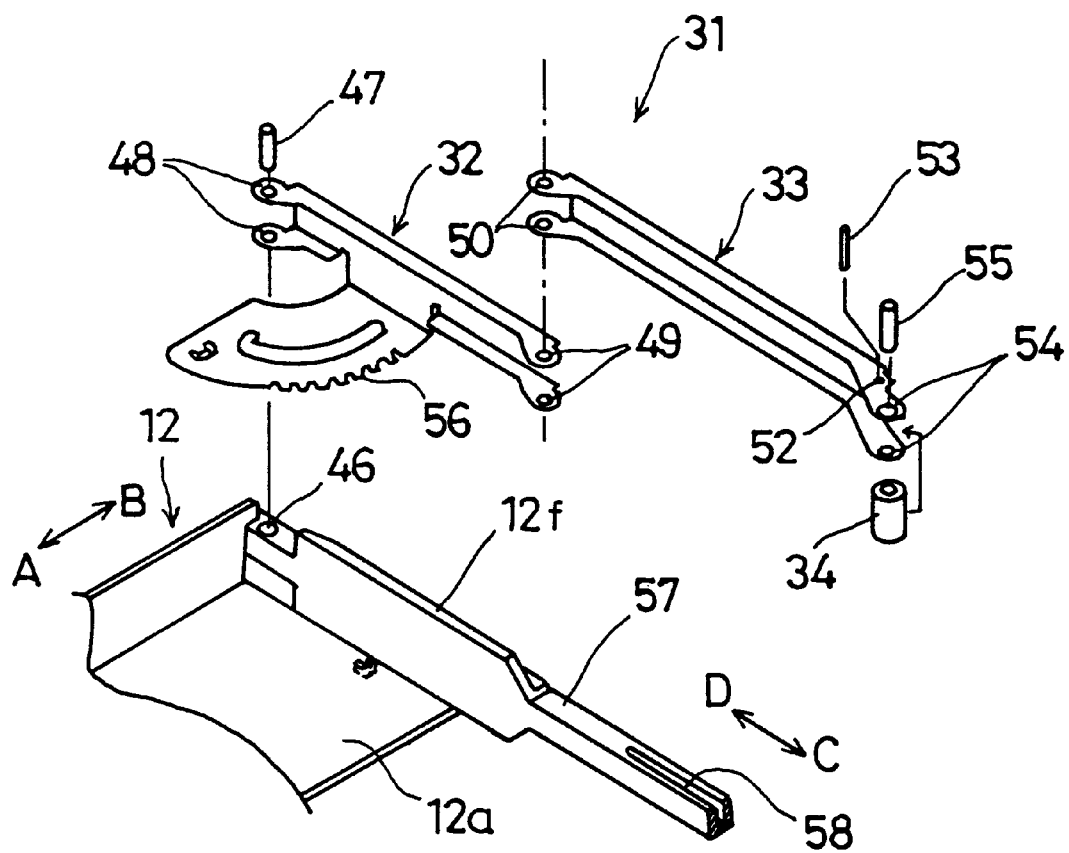
FIG. 6 is an exploded view of a shutter arm in the disk apparatus.

Next, FIG. 6 shows a configuration of the shutter arm 31 in the shutter open/close unit 15 of the disk apparatus 11.

Figure 7:
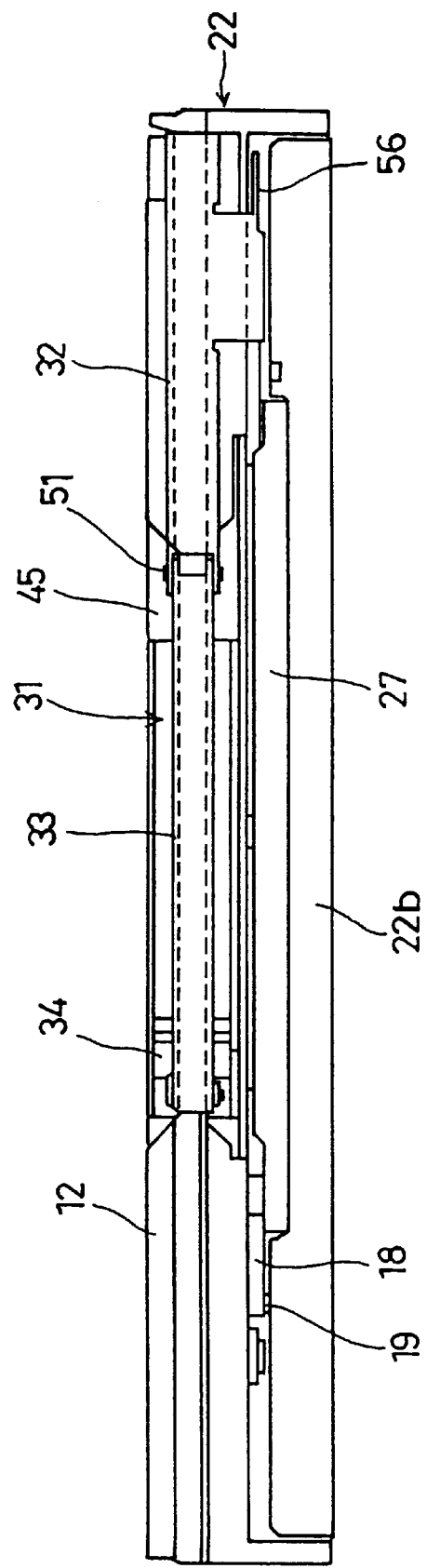
FIG. 7 is a rear view of the disk tray in which the shutter arm is installed.
Figure 8:
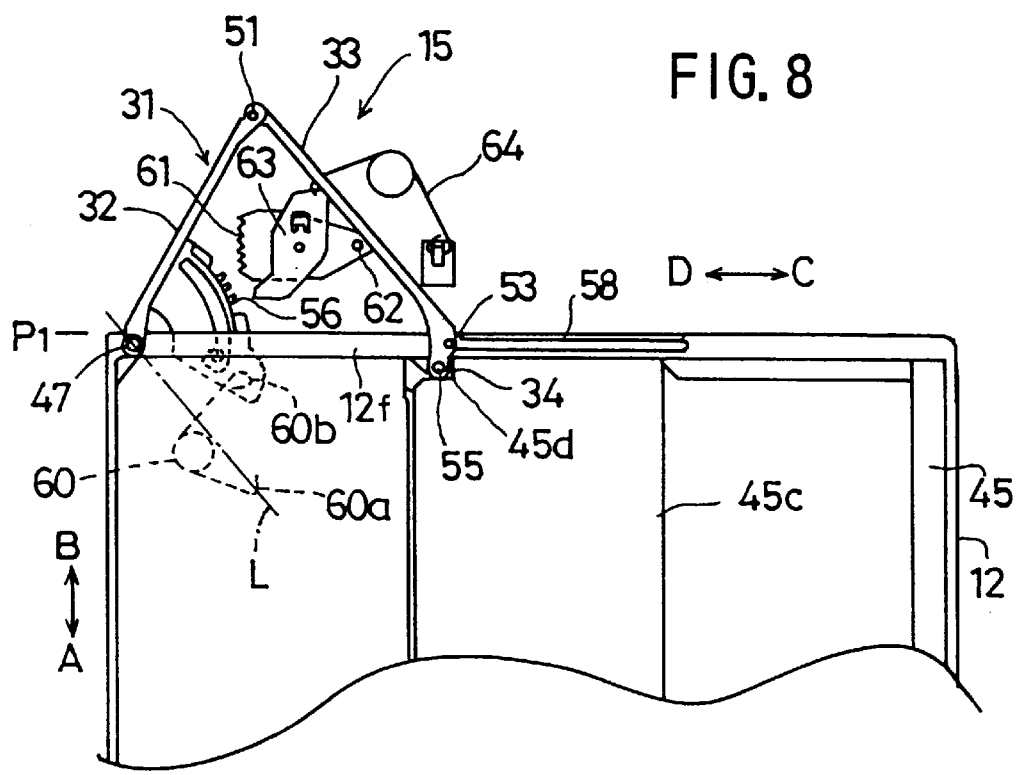
FIG. 8 is a diagram for explaining a condition of a shutter open/close unit before the disk cartridge is inserted in the disk tray.

FIG. 7 is a rear view of the disk tray 12 in which the shutter arm 31 is installed. FIG. 8 shows a condition of the shutter open/close unit 15 before the disk cartridge 45 is inserted in the disk tray 12.

The shutter arm 31 comprises a pin 47 which is fitted into a small hole 46 at one end of a rear surface 12f of the tray 12. The first arm 32 includes a pair of small holes 48 at one end of the first arm 32, and the pin 47 is inserted in the small holes 48 of the first arm 32 such that the first arm 32 is rotatably supported at the rear end corner of the tray 12 and rotatable around the pin 47. The first arm 32 includes a pair of small holes 49 at the other end of the first arm 32, and the small holes 49 are linked with the second arm 33.

The second arm 33 includes a pair of burring portions 50 at one end of the second arm 33, and the burring portions 50 are deformed so as to extend upward from the top of the second arm 33 and extend downward from of the bottom of the second arm 33. The burring portions 50 of the second arm 33 are fitted into the small holes 49 of the first arm 32 by crimping of the burring portions 50 such that the second arm 33 is supported by the first arm 32 and rotatable around crimped portions 51 (shown in FIG. 7) of the second arm 33.

The shutter arm 31 comprises a guide pin 53 and a rotatable shaft 55. The second arm 33 includes a small hole 52, and the guide pin 53 is fitted into the small hole 52 of the second arm 33. The second arm 33 includes a pair of small holes 54 at the other end of the second arm 33, and the shaft 55 is fitted into the small holes 54 of the second arm 33. The connecting roller 34 is rotatably supported on the shaft 55.

In the shutter arm 31, the base of the first arm 32 is rotatably supported at the end of the rear surface 12f of the tray 12 by the pin 47. The base of the second arm 33 is rotatably supported on the end of the first arm 32. The leading edge of the second arm 33 is movably guided along the rear surface 12f of the tray by the guide pin 53. The connecting roller 34 at the end of the second arm 33 is movable along the rear surface 12f of the tray 12 in one of the opening direction C and the closing direction D. Thus, the shutter open/close unit 15 opens or closes the shutter 45c in the cartridge 45 by the connection of the connecting roller 34 and the shutter 45c in response to the rotation of the first arm 32 around the pin 47.

As shown in FIG. 7, a thickness of the shutter arm 31, including the first arm 32 and the second arm 33, is smaller than the thickness of the cartridge 45, and the shutter arm 31 does not extend upward from the rear surface 12f of the tray 12 during the rotation of the first arm 32 around the pin 47. Therefore, it is not necessary to provide an additional space above the tray 12 for the shutter arm 31. The disk apparatus 11 of the present embodiment is effective in providing a small-thickness structure for an optical disk drive installed in a notebook-size computer.

In the shutter arm 31, the first arm 32 and the second arm 33 have a U-shaped cross section and are produced by bending of a sheet-metal material. The shutter arm 31 may be formed with a light weight while a sufficient strength of the shutter arm 31 is ensured. In the shutter arm 31, the pin 47, the crimped portions 51, the guide pin 53 and the shaft 55 are fitted in the holes 48, the holes 49, the hole 52 and the holes 54, respectively. Further, as shown in FIG. 6, the first arm 32 includes a gear 56 integrally formed with the bottom of the first arm 32. The gear 56 has a generally quadrant configuration, and a center of the gear 56 is located at the end of the first arm 32 or at the shaft 47. The gear 56 extends laterally from an intermediate portion of the first arm 32. The first arm 32 is rotated around the pin 47 by engagement of the gear 56 with a rack 61 on the chassis 22 in response to the movement of the tray 12.

As shown in FIG. 6, in the rear surface 12f of the tray 12, an arm receiving portion 57 extending along the rear surface 12f in the direction C is provided. The first arm 32 and the second arm 33, each having a recessed portion, are fitted into the arm receiving portion 57 of the rear surface 12f when the first arm 32 is rotated to a position parallel to the direction C. A guide groove 58 extending in the direction C is provided on the top of the arm receiving portion 57 of the rear surface 12f of the tray 12. The guide pin 53 at the end of the second arm 33 is fitted in the guide groove 58 such that the guide pin 53 is movable along the rear surface 12f of the tray 12 when the first arm 32 is rotated around the shaft 47. The connecting pin 34 provided on the shaft 55 at the end of the second arm 33 is also movable along the rear surface 12f of the tray 12 in one of the opening direction C and the closing direction D. Thus, the shutter open/close unit 15 opens or closes the shutter 45c in the cartridge 45 by the connection of the connecting roller 34 and the shutter 45c in response to the rotation of the first arm 32 around the pin 47.

A helical torsion spring 60, which is indicated by a dotted line in FIG. 8, has an end 60a fitted to the bottom of the tray 12, and the other end 60b fitted to the leading edge of the gear 56 of the first arm 32. When the shutter open/close unit 15 is in the condition of FIG. 8, the end 60b of the spring 60 is located on the right side of a line "L" (indicated by a one-dot chain line in FIG. 8) interconnecting the position of the pin 47 and the position of the end 60a of the spring 60. The spring 60 at this time exerts an actuating force on the first arm 32 such that the first arm 32 is actuated to the condition of FIG. 8 by the spring 60. The first arm 32 in the condition of FIG. 8 is rotated counterclockwise around the pin 47 by the spring 60. The second arm 33 in the condition of FIG. 8 is rotated clockwise around the guide pin 53 by the spring 60.

Accordingly, before the cartridge 45 is inserted in the tray 12, the first arm 32 and the second arm 33 are held in an L-shaped condition as shown in FIG. 8. The connecting roller 34 at this time is located at the end of the guide groove 58 in the direction D, and is waiting for an insertion of the cartridge 45 in the tray 12.

As shown in FIG. 8, the rack 61 is rotatably supported on the base 22b of the chassis 22 by a shaft 62. The gear 56 of the first arm 32 is engaged with the rack 61 in response to the movement of the tray 12. A rack locking plate 63 is provided on the chassis 22 to lock the rack 61 at a locking position. A helical torsion spring 64 is provided on the chassis 22. One end of the spring 64 is fixed to the chassis 22, and the other end of the spring 64 is fixed to the rack locking plate 63. The spring 64 exerts an actuating force on the rack locking plate 63 such that the rack locking plate 63 is rotated clockwise around a shaft of the rack locking plate 63 by the spring 64. As the rack locking plate 63 at the locking position shown in FIG. 8 is connected to the rack 61, the rotation of the rack locking plate 63 by the spring 64 is inhibited by the rack 61.

The rack locking plate 63 is rotated clockwise around the shaft of the rack locking plate 63 to an unlocking position by a rib (not shown) downwardly extending from the bottom of the tray 12 when the tray 12 is moved relative to the chassis 22 in the direction B. As the rack locking plate 63 is rotated clockwise to the unlocking position shown in FIG. 3, the rack 61 is also rotated clockwise together with the rack locking plate 63. When the rack 61 is rotated to the position shown in FIG. 3, the gear 56 of the first arm 32 is disconnected from the rack 61 and the rack 61 is separated from the gear 56.

Figure 9:
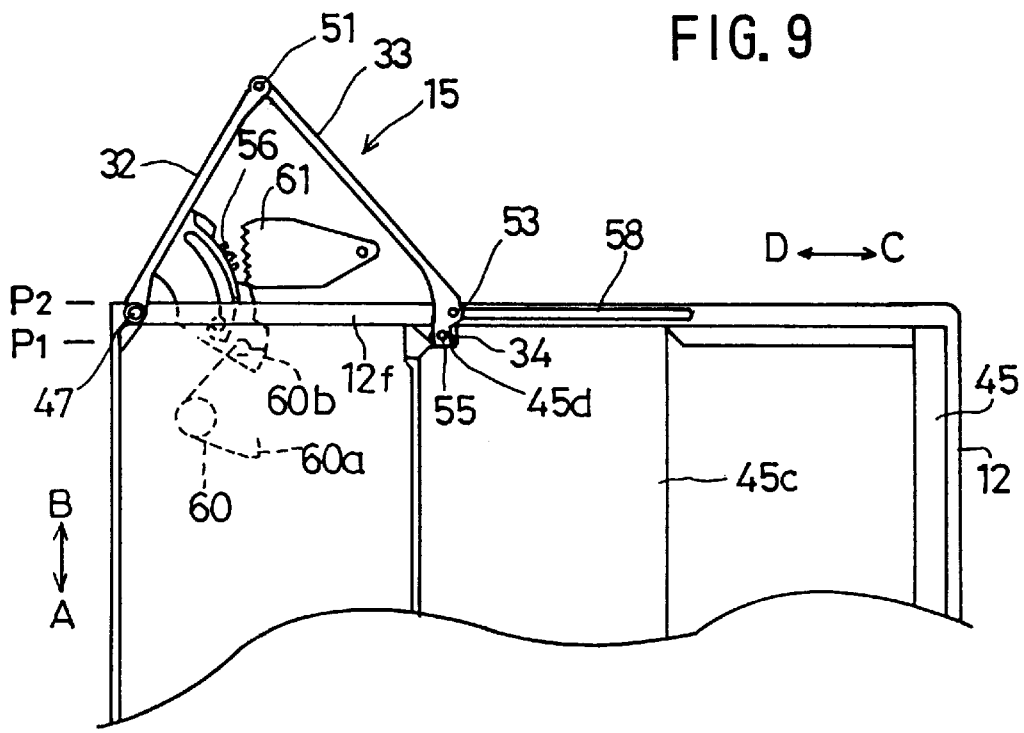
FIG. 9 is a diagram for explaining a condition of the shutter open/close unit when a gear of the shutter open/close unit is engaged with a rack on a chassis.
Figure 10:
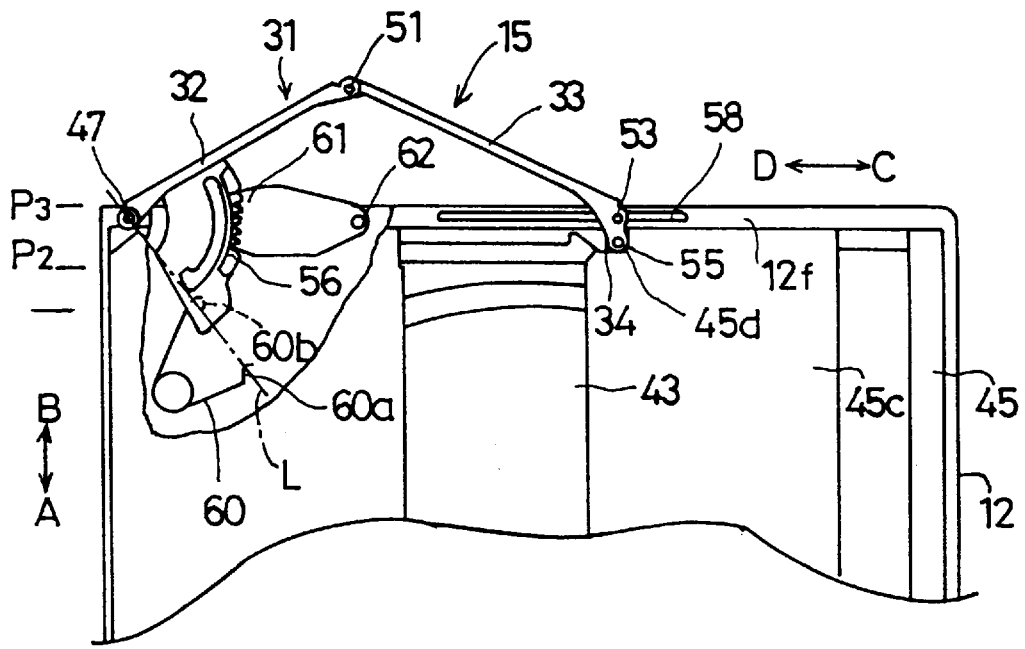
FIG. 10 is a diagram for explaining an operation of the shutter open/close unit to open a shutter in the cartridge in response to a movement of the tray.
Figure 11:
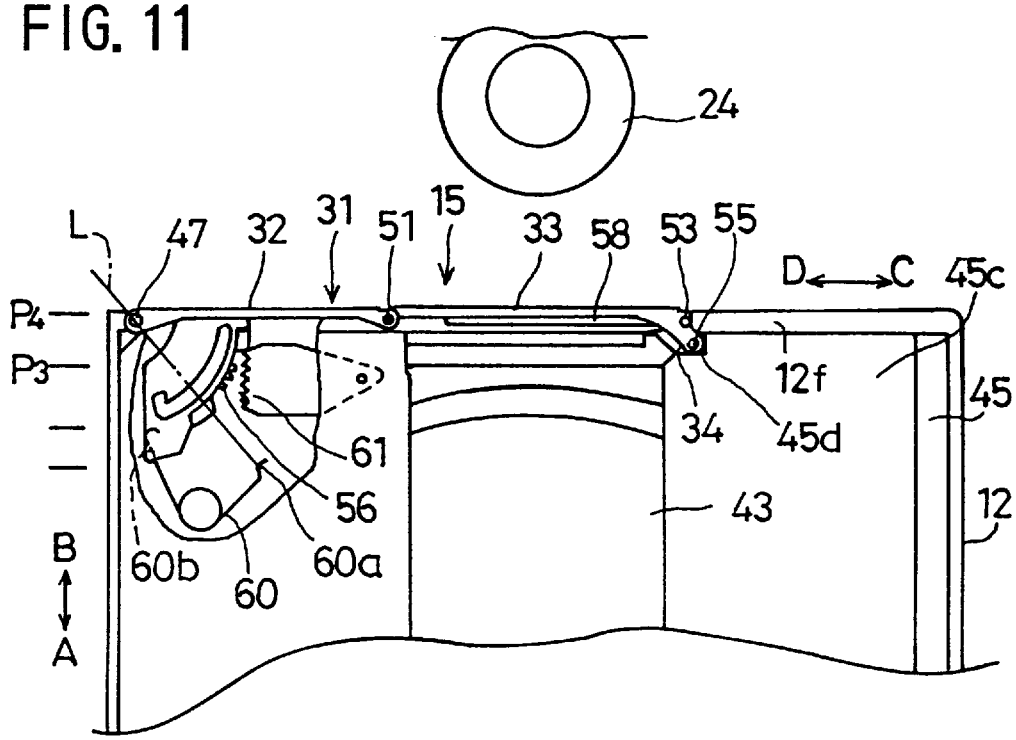
FIG. 11 is a diagram for explaining a condition of the shutter open/close unit when the shutter in the cartridge is fully open.

Next, FIG. 9 shows a condition of the shutter open/close unit 15 when the gear 56 of the shutter open/close unit 15 is engaged with the rack 61 on the chassis 22. FIG. 10 shows an operation of the shutter open/close unit 15 to open the shutter 45c in the disk cartridge 45 in response to a movement of the tray 12. FIG. 11 shows a condition of the shutter open/close unit 15 when the shutter 45c in the cartridge 45 is fully open.

When the rear end surface 12f of the tray 12 is at a position "P1" indicated in FIG. 8, the tray 12 is located at the disk-change position. If the cartridge 45 is inserted in the tray 12, the connecting roller 34 of the shutter open/close unit 15 is connected to a connecting portion 45d of the shutter 45c in the cartridge 45 as shown in FIG. 8. When the tray 12 is moved in the direction B to a position "P2" indicated in FIG. 9, the gear 56 of the first arm 32 starts engagement with the rack 61 on the chassis 22.

When the tray 12 is further moved in the direction B to a position "P3" indicated in FIG. 10, the first arm 32 is rotated clockwise around the pin 47 by the engagement of the gear 56 and the rack 61. As the second arm 33 is linked with the first arm 32 via the crimped portions 51, the second arm 33 is rotated counterclockwise around the guide pin 53. The guide pin 53 is moved along the guide groove 58 in the direction C. The connecting roller 34 is also moved along the guide grove 58 in the direction C by the rotation of the first arm 32, so that the shutter 45c in the cartridge 45 is opened by the connecting roller 34 due to the connection of the roller 34 and the connecting portion 45d.

When the tray 12 is further moved in the direction to a position "P4" indicated in FIG. 11, the first arm 32 and the second arm 33 in the shutter open/close unit 15 are rotated so as to extend along the rear end surface 12f of the tray 12 in the direction C. Accordingly, after the cartridge 45 is inserted in the tray 12, the first arm 32 and the second arm 33 are held in a straight-line condition shown in FIG. 11.

When the shutter open/close unit 15 is in the condition of FIG. 11, the shutter 45c in the cartridge 45 is fully open. As the disk 43 in the cartridge 45 is exposed with the shutter 45c at the open position, this allows the optical pickup unit 25 to be used to access the disk 43 to read data from or write data onto the disk 43. The cartridge 45 held on the tray 12 at this time is located in front of the turntable 24. Before the shutter 45c passes over the turntable 24 during the rearward movement of the tray 12, the shutter 45c in the cartridge 45 is fully open.

When the shutter open/close unit 15 is in the condition of FIG. 11 and the shutter 45c in the cartridge 45 is fully opened by the connecting roller 34, the first arm 32 and the second arm 33 are held in the straight-line condition due to the actuating force of the spring 60. When the shutter open/close unit 15 is in the condition shown in FIG. 10, the end 60b of the spring 60 is located on the line "L" (indicated by a one-dot chain line in FIG. 10) inter-connecting the position of the pin 47 and the position of the end 60a of the spring 60. The spring 60 at this time exerts the actuating force on the first arm 32 such that the first arm 32 is actuated toward the pin 47 by the spring 60.

When the shutter open/close unit 15 is in the condition shown in FIG. 11, the end 60b of the spring 60 is located on the left side of the line "L" inter-connecting the position of the pin 47 and the position of the end 60a of the spring 60. The spring 60 at this time exerts the actuating force on the first arm 32 such that the first arm 32 is rotated clockwise around the pin 47 by the spring 60. Thus, the first arm 32 and the second arm 33 are held in the straight-line condition due to the actuating force of the spring 60.

As described above, the gear 56 of the first arm 32 is engaged with the rack 61 on the chassis 22 in response to the rearward movement of the tray 12, and the connecting roller 34 in the shutter open/close unit 15 can quickly open the shutter 45c in the cartridge 45. In addition, before the shutter 45c passes over the turntable 24 during the rearward movement of the tray 12, the shutter 45c in the cartridge 45 is fully opened by the connecting roller 34.

Figure 19:
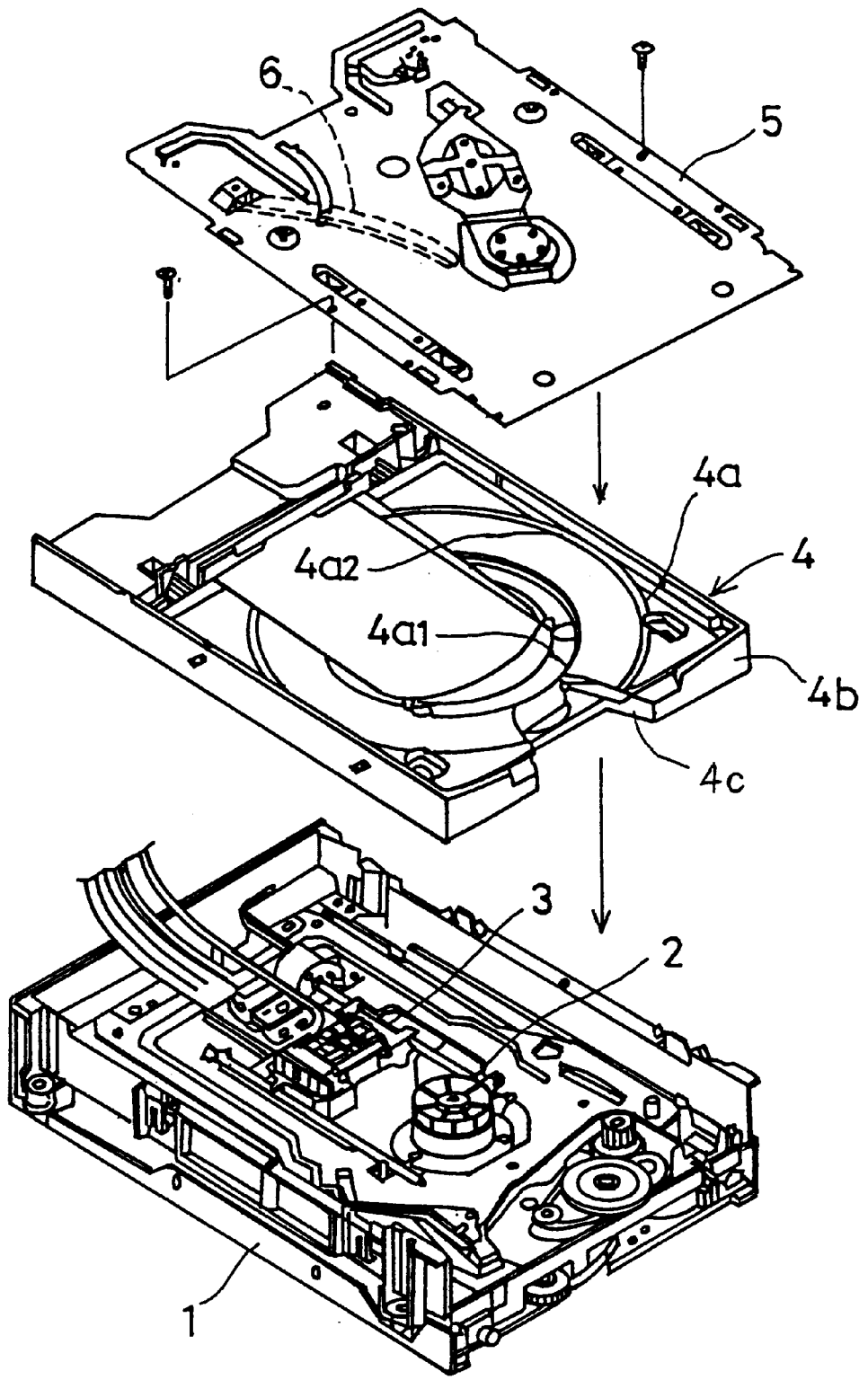
FIG. 19 is a perspective view of a conventional disk apparatus in which either a CD-ROM or a PD disk cartridge can be held on a disk tray at a loaded position.

In the conventional disk apparatus of FIG. 19, the support plate 5 is provided on the disk tray 4, and the upper area located above the chassis 1 is enclosed by the support plate 5. As described above, the shutter lever 6 is provided on the bottom surface of the support plate 5, and the shutter lever 6 serves to open the shutter in the disk cartridge when the cartridge is inserted in the tray 4 and the tray 4 is moved from the disk-change position to the disk-loaded position. In the conventional disk apparatus of FIG. 19, a height of the tray 4 at which the cartridge is inserted and the shutter in the cartridge is opened by the shutter lever 6, must be located above the turntable so as to avoid interference of the shutter lever 6 with the turntable during the rearward movement of the tray.

However, in the disk apparatus 11 of the present embodiment, before the shutter 45c passes over the turntable 24 during the rearward movement of the tray 12, the shutter 45c in the cartridge 45 is fully opened by the connecting roller 34. The height of the tray 12 at which the cartridge 45 is inserted can be reduced to such a position that the disk 43 in the cartridge 45 is not in contact with the turntable 24. The disk apparatus 11 of the present embodiment is effective in providing a small-thickness structure for an optical disk drive installed in a notebook-size computer.

Further, since, in the disk apparatus 11 of the present embodiment, the cartridge 45 held on the tray 12 passes beneath the damper 44 during the rearward movement of the tray 12 while the shutter 45c in the cartridge 45 is fully opened, it is possible to locate the clamper 44 on the top plate 22a of the chassis 22 at a height lower than the top of the shutter 45c of the cartridge 45. The disk apparatus 11 of the present embodiment is effective in providing a small-height structure for an optical disk drive installed in a notebook-size computer.

In addition, the support plate 5 for supporting the shutter lever 6 thereon, in the conventional disk apparatus of FIG. 19, is not required by the disk apparatus 11 of the present embodiment. Thus, the disk apparatus 11 of the present embodiment is effective in providing a small-height structure for an optical disk drive installed in a notebook-size computer.

When taking the cartridge 45 out of the tray 12 after the cartridge 45 is held on the tray 12, the operator presses the eject button 17 on the front bezel 16. When the eject button 17 is pressed, the lock lever 18 on the back side of the tray 12 is disconnected from the connecting pin 19 on the chassis 22, so that the tray locking unit 13 unlocks the tray 12. As the tray 12 is unlocked, the pressing lever 20 in the tray pressing unit 14 pushes the rear end wall 23 of the chassis 22 due to the actuating force of the spring 21 so that the tray 12 is moved relative to the chassis 22 in the direction A by the pressing lever 20. This makes it possible for the operator to easily pull the tray 12 out of the chassis 22 and move the tray 12 to the disk-change position, as shown in FIG. 1.

As the tray 12 is moved relative to the chassis 22 in the direction A after the eject button 17 is pressed, the cartridge 45 on the tray 12 passes over the turntable 24. After the cartridge 45 passes over the turntable 24, the shutter 45c in the cartridge 45 is closed by the shutter open/close unit 15 in accordance with a procedure which reverses the above-described procedure.

Figure 12:
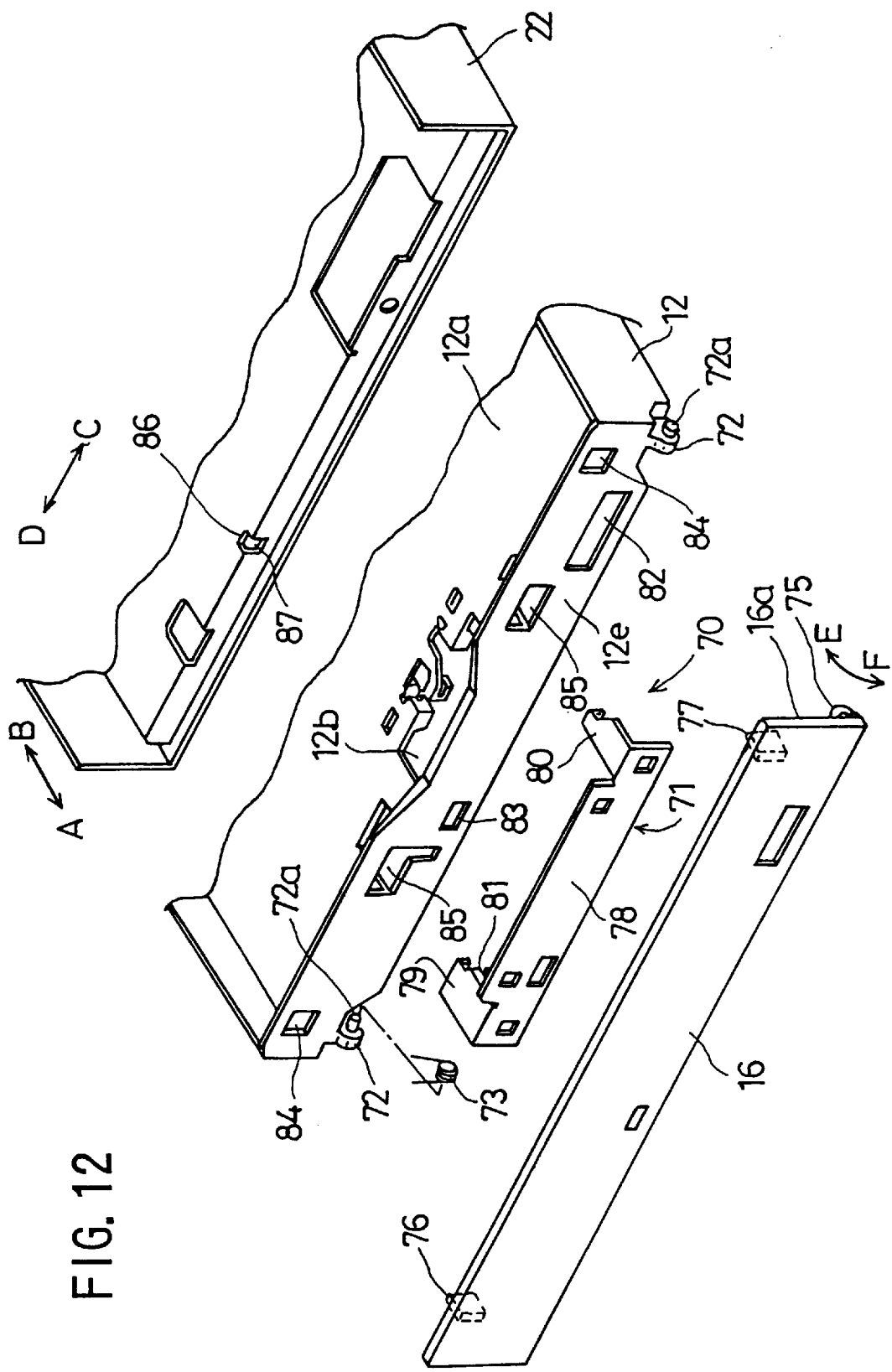
FIG. 12 is an exploded view of a cartridge ejection unit in the disk apparatus.

Next, FIG. 12 shows the cartridge ejection unit 70 in the disk apparatus 11 of the present embodiment.

Figure 13:
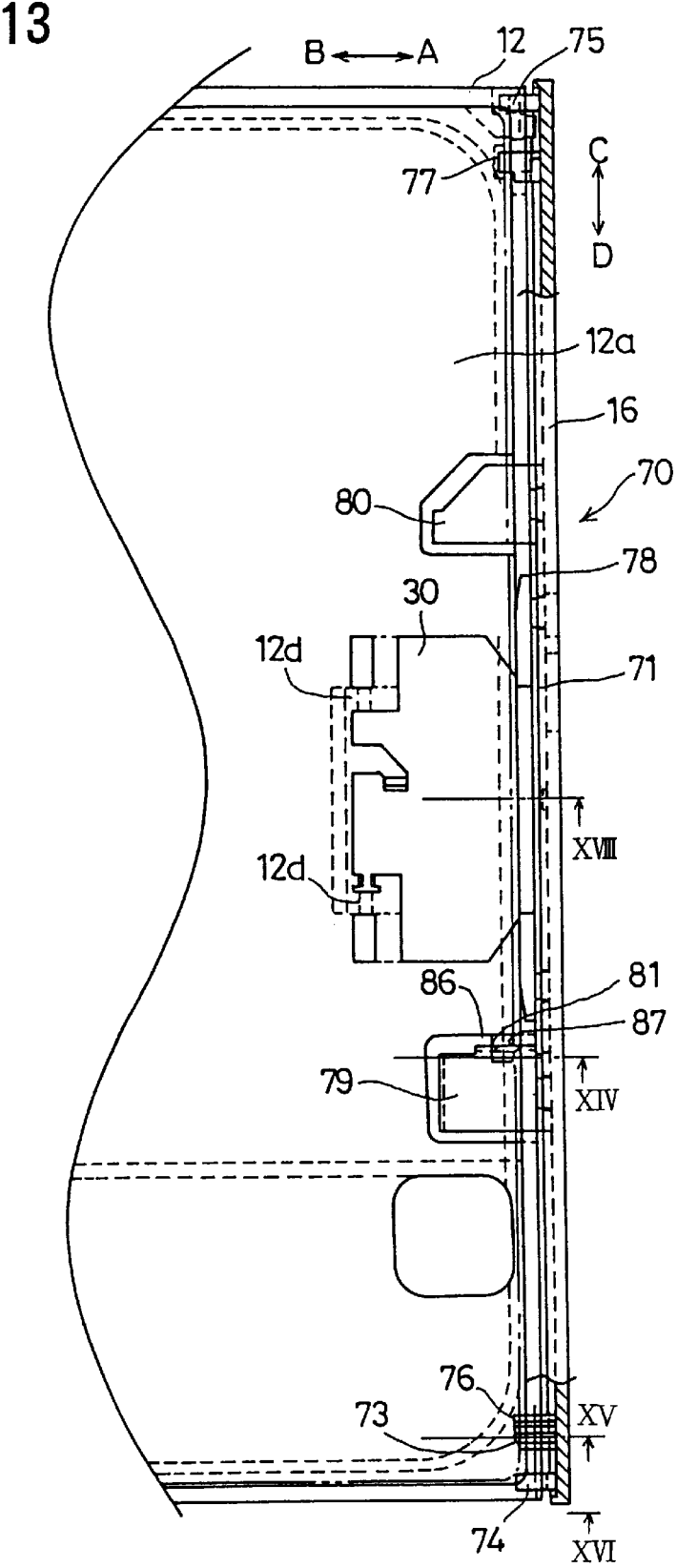
FIG. 13 is an enlarged top view of the cartridge ejection unit in the disk apparatus.
Figure 14:
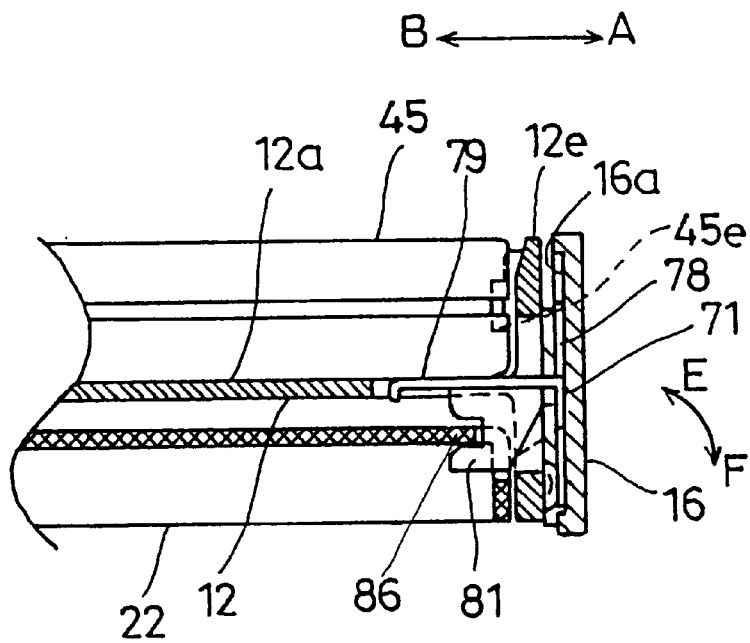
FIG. 14 is a cross-sectional view of the cartridge ejection unit taken along a line XIV indicated in FIG. 13.
Figure 15:
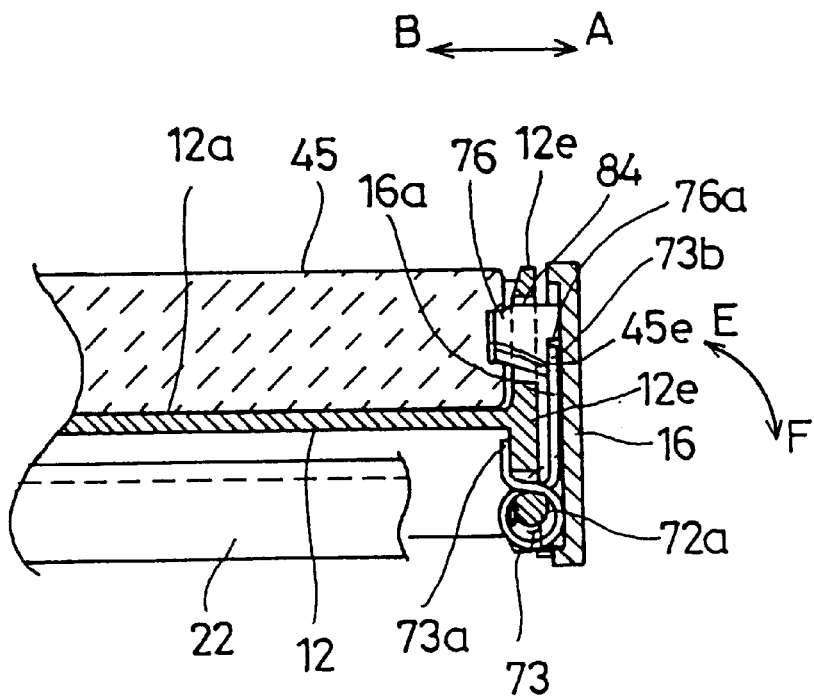
FIG. 15 is a cross-sectional view of the cartridge ejection unit taken along a line XV indicated in FIG. 13.

FIG. 13 is an enlarged top view of the cartridge ejection unit 70 in the disk apparatus 11. FIG. 14 is a cross-sectional view of the cartridge ejection unit 70 taken along a line XIV indicated in FIG. 13, wherein the tray 12 is set at the disk-loaded position. FIG. 15 is a cross-sectional view of the cartridge ejection unit 70 taken along a line XV indicated in FIG. 13.

As shown in FIGS. 12–15, the cartridge ejection unit 70 comprises the front bezel 16, a cartridge lifting member 71, a pair of supporting members 72, and a helical torsion spring 73.

The front bezel 16 is pulled open by the operator when taking the cartridge 45 out of the tray 12. The cartridge lifting member 71 is provided on the cartridge holding surface 12a of the tray 12, and the bottom of the cartridge 45, when inserted, is brought into contact with the cartridge lifting member 71. The supporting members 72 are provided at the front end corners of the tray 12, and rotatably support the front bezel 16 at both ends of the front bezel 16 such that the front bezel 16 is vertically rotatable around the supporting members 72 in one of an upward direction, indicated by the arrow E in FIG. 12, and a downward direction, indicated by the arrow F in FIG. 12. The spring 73 is provided on the tray 12 and exerts an actuating force on the front bezel 16 such that the front bezel 16 is rotated in the direction E to a front surface 12e of the tray 12 by the spring 73.

The front bezel 16 includes a pair of bearing portions 74 and 75 on an inside surface 16a of the front bezel 16, and a pair of retaining portions 76 and 77 on the inside surface 16a. The inside surface 16a confronts the front surface 12e of the tray 12. The supporting members 72 have a laterally extending shaft 72a on each of the supporting members 72. The shafts 72a of the supporting members 72 are fitted to the bearing portions 74 and 75 such that the front bezel 16 is rotatably supported on the shafts 72a. The retaining portions 76 and 77 are fitted into recesses 45e (shown in FIG. 5B) of the cartridge 45 when inserted, so as to ensure that the cartridge 45 is maintained at a given position in the tray 12 by the connection of the retaining portions 76 and 77 and the recesses 45e of the cartridge 45 due to the actuating force of the spring 73.

The cartridge lifting member 71, as shown in FIG. 12, includes a fixed plate 78, a pair of contact arms 79 and 80, and a retaining lug 81. The fixed plate 78 is fixed to the front bezel 16 in the middle of the inside surface 16a of the front bezel 16. The contact arms 79 and 80 extend from both ends of the fixed plate 78 in the direction B. The contact arms 79 and 80 are brought into contact with the bottom of the cartridge 45 when inserted. The retaining lug 81 is provided on the side of the contact arm 79.

In the cartridge lifting member 71, the length of the contact arms 79 and 80 in the direction B is predetermined to be such a length that the contact arms 79 and 80 touch the bottom of the cartridge 45 when inserted but do not touch the outer periphery of the disk 43 (or the CD-ROM) when inserted. The contact arms 79 and 80 are provided away from the outer periphery of the disk 43 (the CD-ROM) held on the tray 12, so as to avoid interference of the contact arms 79 and 80 with the recording layer of the disk 43 when inserted or when the front bezel 16 is erroneously pressed.

The front surface 12e of the tray 12, as shown in FIG. 12, includes an eject button hole 82, an LED hole 83, a pair of retainer holes 84, and a pair of contact arm holes 85. The eject button 17 is installed in the eject button hole 82. An LED (light-emitting diode) indicator lamp (not shown) is installed in the LED hole 83. The retaining portions 76 and 77 of the front bezel 16 are inserted in the retainer holes 84. The contact arms 79 and 80 of the cartridge lifting member 71 are inserted in the contact arm holes 85.

The chassis 22, as shown in FIG. 12, includes a connecting portion 86 at a front edge of the chassis 22, and an opening 87 in which the connecting portion 86 is provided. When the tray 12 is set at the disk-loaded position, the retaining lug 81 of the cartridge lifting member 71 is fitted to the connecting portion 86 of the chassis 22. The opening 87 is provided to allow the retaining lug 81 to be smoothly fitted to the connecting portion 86 when the tray 12 is moved in the direction B to the disk-loaded position.

The spring 73 is provided on the shaft 72a of the supporting member 72 at the front left corner of the tray 12. One end 73a of the spring 73, as shown in FIG. 15, is fitted to the back side of the front surface 12e of the tray 12, and the other end 73b of the spring 73 is fitted to a groove 76a on the bottom of the retaining portion 76 of the front bezel 16. Thus, the spring 73 exerts the actuating force on the front bezel 16 such that the front bezel 16 is rotated around the shaft 72a of the supporting member 72 in the direction E by the spring 73 so as to press the front bezel 16 toward the front surface 12e of the tray 12.

As described above, when the tray 12 is set at the disk-loaded position, the lock lever 18 of the locking unit 13 is connected to the connecting pin 19 on the bottom of the tray 12. The tray 12 is locked at the disk-loaded position by the locking unit 13. At the same time, as shown in FIG. 14 and FIG. 15, the front bezel 16 is actuated in the direction E due to the actuating force of the spring 73, and the retaining lug 81 of the cartridge lifting member 71 fixed to the front bezel 16, is fitted to the connecting portion 86 of the chassis 22. Downward rotation of the front bezel 16 around the shafts 72a of the supporting members 72 in the direction F is inhibited by the connection of the retaining lug 81 and the connecting portion 86.

Accordingly, when the tray 12 on which the cartridge 45 is held is set at the disk-loaded position, the front bezel 16 on the front surface 12e of the tray 12 is locked by the connection of the retaining lug 81 and the connecting portion 86. This makes it impossible for the operator to take the cartridge 45 out of the tray 12 by pulling the front bezel 16 in the direction F. Even if the front bezel 16 is erroneously pulled by the operator, the cartridge ejection unit 70 serves to inhibit the cartridge 45 from being taken out of the tray 12 when the tray 12 is set at the disk-loaded position.

Further, when the tray 12 on which the cartridge 45 is held is set at the disk-loaded position, the retaining portions 76 and 77 in the cartridge ejection unit 70 are snugly fitted into the recesses 45e of the cartridge 45. The cartridge 45 is held at the given position in the tray 12 by the actuating force of the spring 73, which ensures that the cartridge 45 does not rattle in the tray 12. As the center of the disk 43 in the cartridge 45 held on the tray 12 substantially accords with the center of the turntable 24 on the chassis 22, the disk 43 in the cartridge 45 is clamped between the turntable 24 and the damper 44 when the traverse unit 27 is moved up in response to the rearward movement of the tray 12.

Next, a description will be given of a cartridge ejection operation of the cartridge ejection unit 70 in the disk apparatus 11.

Figure 16:
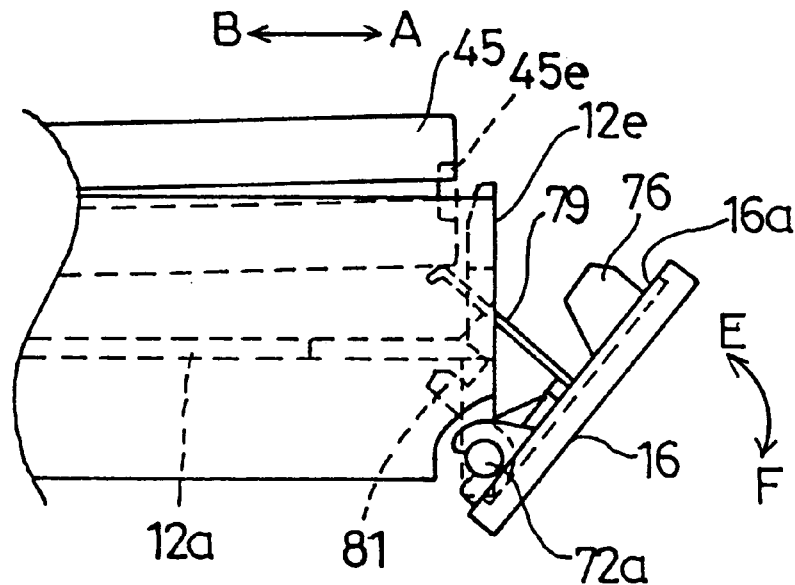
FIG. 16 is a cross-sectional view of the cartridge ejection unit taken along a line XVI indicated in FIG. 13.
Figure 17:
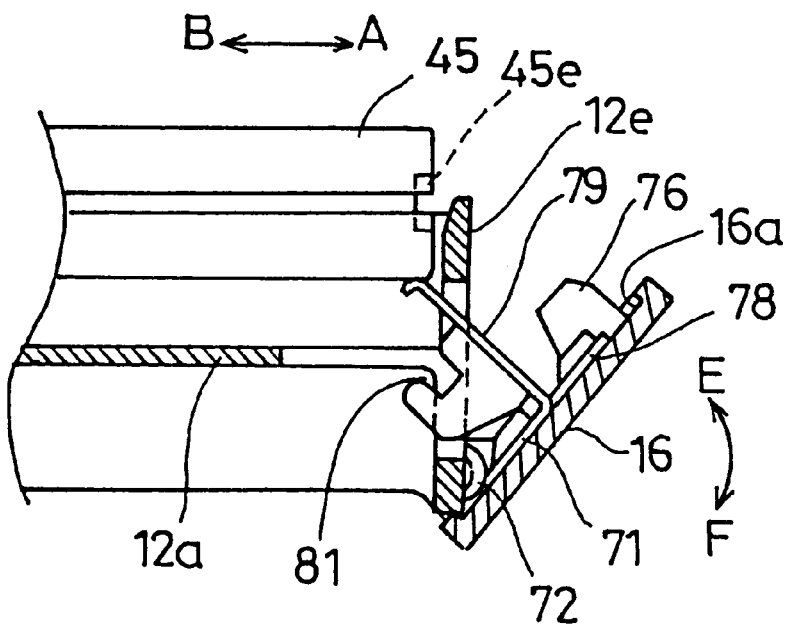
FIG. 17 is a diagram for explaining an operation of the cartridge ejection unit of FIG. 14.
Figure 18:
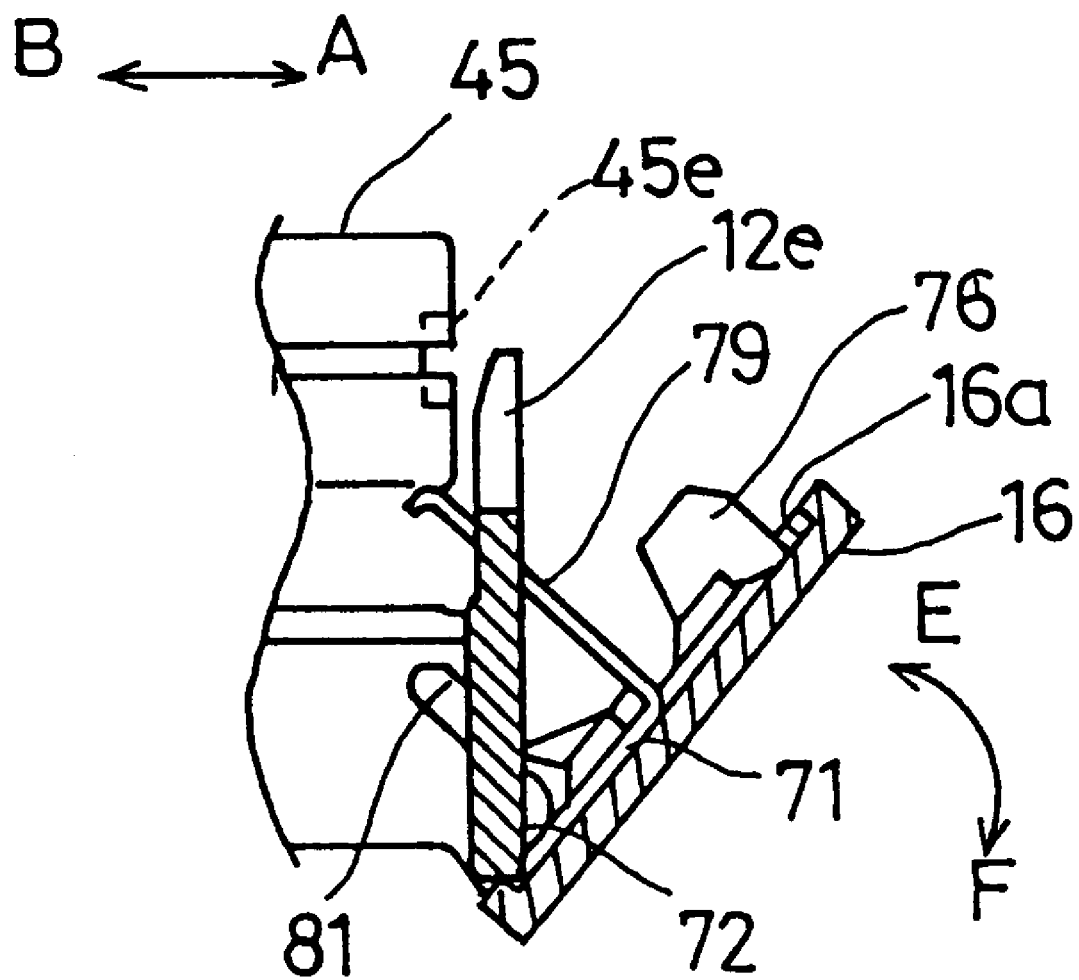
FIG. 18 is a cross-sectional view of the cartridge ejection unit taken along a line XVIII indicated in FIG. 13.

FIG. 16 is a cross-sectional view of the cartridge ejection unit 70 taken along a line XVI indicated in FIG. 13. FIG. 17 shows an operation of the cartridge ejection unit 70 of FIG. 14. FIG. 18 is a cross-sectional view of the cartridge ejection unit 70 taken along a line XVIII indicated in FIG. 13.

When the tray 12 is set at the disk-change position, the retaining lug 81 in the cartridge ejection unit 70 is disconnected from the connecting portion 86 of the chassis 22. The front bezel 16 is rotatable around the shafts 72a of the supporting members 72. In order to take the cartridge 45 out of the tray 12, the operator pulls the front bezel 16 in the direction F so that the front bezel 16 is rotated downward as shown in FIGS. 16–18.

As the front bezel 16 is rotated around the shafts 72a of the supporting members 72 in the direction F, the cartridge lifting member 71, fixed to the inside surface 16a of the front bezel 16, is also rotated around the shafts 72a in the direction F together with the front bezel 16. By this rotation of the cartridge lifting member 71, the contact arms 79 and 80 are moved up in the direction F. As the contact arms 79 and 80 are in contact with the bottom of the cartridge 45 on the tray 12, the front portion of the cartridge 45 is lifted by the contact arms 79 and 80. By the upward movement of the contact arms 79 and 80, the front portion of the cartridge 45 is separated from the cartridge holding surface 12a of the tray 12 and lifted to a position higher than the cartridge holding surface 12a of the tray 12.

As the front portion of the cartridge 45 is lifted to the higher position on the tray 12 by the cartridge ejection unit 70, the operator can easily take the cartridge 45 out of the tray 12. The contact arms 79 and 80 in contact with the bottom of the cartridge 45 are smoothly moved up by the rotation of the front bezel 16 around the shafts 72a in the direction F when the front bezel 16 is pulled by the operator, and the cartridge ejection unit 70 in the disk apparatus 11 provides a good operability for the operator. The operator is required to use only a small operating force to pull the front bezel 16 in the direction F, and the cartridge 45, which was lifted to the higher position on the tray 12, can be easily taken out of the tray 12 by the operator without using a great operating force.

As described above, in the disk apparatus 11 of the present embodiment, the front portion of the cartridge 45 is lifted to the higher position on the tray 12 by the cartridge ejection unit 70, and the operator can easily take the cartridge 45 out of the tray 12. It is not necessary to enlarge the entire thickness of the disk tray 12 in order to increase the strength of the disk apparatus as in the conventional disk apparatus. The disk apparatus 11 of the present embodiment is effective in providing a small-thickness structure for an optical disk drive installed in a notebook-size computer while the disk tray 12 is capable of holding one of the CD-ROM and the disk cartridge at the disk-loaded position.

In the above-described embodiment, the front bezel 16 serves as the operation member which is manipulated by the operator when taking the cartridge 45 out of the tray 12. The present invention is not limited to the above-described embodiment. Alternatively, an operation lever which is connected to the cartridge lifting member 71 and rotatably supported on the front bezel 16 may be provided to serve as the operation member.

In the disk apparatus 11 of the present embodiment, the disk loading and ejecting operations when the CD-ROM (or the disk 43) is inserted in the tray 12 are the same as the disk loading and ejecting operations of the disk apparatus 11 when the disk cartridge 45 is inserted in the tray 12, except for the operation of the shutter open/close unit 15.

The disk apparatus 11 of the present embodiment can be applied to not only the optical disk drive capable of holding one of a CD-ROM and a PD disk cartridge on a disk tray as in the above-described embodiment, but also a compact disk drive, a magnetic disk drive, a magneto-optical disk drive, and other optical disk drives.

Further, the present invention is not limited to the above-described embodiment, and variations and modifications may be made without departing from the scope of the present invention.

What is claimed is:

1. A disk apparatus comprising:
    a disk tray having a cartridge holding surface for holding a disk cartridge thereon, the disk cartridge containing an optical disk therein, the tray being movable between a disk-change position and a disk-loaded position;
    a cartridge lifting member, provided on the tray, for lifting the cartridge to a position higher than the cartridge holding surface in the tray, said cartridge lifting member having a contact arm brought into contact with a bottom of the cartridge held on the cartridge holding surface of the tray; and
    an operation member for actuating the cartridge lifting member when the tray is set at the disk-change position and the operation member is manipulated by an operator, so that the bottom of the cartridge is lifted to the position higher than the cartridge holding surface by the contact arm in response to a movement of the cartridge lifting member, wherein said cartridge lifting member is fixed to said operation member, and, when the operation member is pressed by the operator in a direction to move the operation member away from the tray, the cartridge lifting member is moved together with the operation member in the direction, so that the bottom of the cartridge is lifted to the position higher than the cartridge holding surface and separated from the cartridge holding surface by the contact arm in response to the movement of the cartridge lifting member.

2. The disk apparatus according to claim 1, wherein said operation member is a front bezel rotatably supported on a front surface of the tray, said front bezel being rotatable between a closed position and an open position, and wherein a spring is provided on the front surface of the tray, said spring exerting an actuating force on the front bezel such that the front bezel is actuated to the closed position by the spring.

3. The disk apparatus according to claim 1, wherein said operation member is a front bezel rotatably supported on a front surface of the tray, said cartridge lifting member being fixed to said front bezel, and, when the front bezel is pressed by the operator in a direction to move the front bezel away from the front surface of the tray, the cartridge lifting member is moved together with the front bezel in the direction, so that the bottom of the cartridge is lifted to the position higher than the cartridge holding surface by the contact arm in response to the movement of the cartridge lifting member.

4. The disk apparatus according to claim 1, further comprising a disk supporting member provided on the tray for supporting the disk cartridge thereon, the disk supporting member being vertically rotatable between a disk-support position, located above the cartridge holding surface, and a horizontal position, located below the cartridge holding surface,
    wherein the disk supporting member is rotated from the disk-support position to the horizontal position by the cartridge when the cartridge is inserted in the tray, the disk supporting member at the horizontal position being placed below the cartridge holding surface in the tray.

5. A disk apparatus comprising:
    a disk tray having a cartridge holding surface for holding a disk cartridge thereon, the disk cartridge containing an optical disk therein, the tray being movable between a disk-change position and a disk-loaded position;
    a cartridge lifting member, provided on the tray, for lifting the cartridge to a position higher than the cartridge holding surface in the tray, said cartridge lifting member having a contact arm brought into contact with a bottom of the cartridge held on the cartridge holding surface of the tray; and
    an operation member for actuating the cartridge lifting member when the tray is set at the disk-change position and the operation member is manipulated by an operator, so that the bottom of the cartridge is lifted to the position higher than the cartridge holding surface by the contact arm in response to a movement of the cartridge lifting member, wherein said operation member has retaining portions fitted into recesses of the cartridge when the cartridge is inserted in the tray, so that the cartridge is maintained at a given position in the tray by connection of the retaining portions and the recesses of the cartridge.

6. A disk apparatus comprising:
    a disk tray having a cartridge holding surface for holding a disk cartridge thereon, the disk cartridge containing an optical disk therein, the tray being movable between a disk-change position and a disk-loaded position;
    a cartridge lifting member, provided on the tray, for lifting the cartridge to a position higher than the cartridge holding surface in the tray, said cartridge lifting member having a contact arm brought into contact with a bottom of the cartridge held on the cartridge holding surface of the tray; and
    an operation member for actuating the cartridge lifting member when the tray is set at the disk-change position and the operation member is manipulated by an operator, so that the bottom of the cartridge is lifted to the position higher than the cartridge holding surface by the contact arm in response to a movement of the cartridge lifting member, wherein said operation member is a front bezel rotatably supported on a front surface of the tray.

7. A disk apparatus comprising:

a disk tray having a cartridge holding surface for holding a disk cartridge thereon, the disk cartridge containing an optical disk therein, the tray being movable between a disk-change position and a disk-loaded position;

a cartridge lifting member, provided on the tray, for lifting the cartridge to a position higher than the cartridge holding surface in the tray, said cartridge lifting member having a contact arm brought into contact with a bottom of the cartridge held on the cartridge holding surface of the tray; and an operation member for actuating the cartridge lifting member when the tray is set at the disk-change position and the operation member is manipulated by an operator, so that the bottom of the cartridge is lifted to the position higher than the cartridge holding surface by the contact arm in response to a movement of the cartridge lifting member, wherein said cartridge lifting member has a retaining lug fitted into a connecting portion of a chassis of the disk apparatus when the tray is set at the disk-loaded position, so that the operation member is locked to the chassis by connection of the retaining lug and the connecting portion.

8. A disk apparatus comprising:

a disk tray having a cartridge holding surface for holding a disk cartridge thereon, the disk cartridge containing an optical disk therein, the tray being movable between a disk-change position and a disk-loaded position;

a cartridge lifting member, provided on the tray, for lifting the cartridge to a position higher than the cartridge holding surface in the tray, said cartridge lifting member having a contact arm brought into contact with a bottom of the cartridge held on the cartridge holding surface of the tray; and an operation member for actuating the cartridge lifting member when the tray is set at the disk-change position and the operation member is manipulated by an operator, so that the bottom of the cartridge is lifted to the position higher than the cartridge holding surface by the contact arm in response to a movement of the cartridge lifting member, wherein said tray has supporting members provided on a front surface of the tray, each of said supporting members having a shaft laterally extending from the supporting member, and said operation member having bearing portions fitted into the shafts of the supporting members, and wherein the operation member is rotatably supported on the front surface of the tray by connection of the bearing portions and the shafts of the supporting members.

9. The disk apparatus according to claim 8, further comprising a spring provided on a front surface of the tray, said spring exerting an actuating force on the operation member such that the operation member is actuated by the spring in a direction to press the operation member toward the front surface of the tray.

* * * * *